United States Patent
Pourjavid

[19]
[11] Patent Number: 5,883,985
[45] Date of Patent: Mar. 16, 1999

[54] METHOD FOR COMPENSATING IMAGE DATA TO ADJUST FOR CHARACTERISTICS OF A NETWORK OUTPUT DEVICE

[75] Inventor: Sussan Pourjavid, Milwaukee, Wis.

[73] Assignee: General Electric Company, Milwaukee, Wis.

[21] Appl. No.: 763,564

[22] Filed: Dec. 10, 1996

[51] Int. Cl.$^6$ ........................................ G06K 9/40
[52] U.S. Cl. ..................... 382/274; 382/131; 382/132; 382/133; 382/134; 382/158; 382/167; 382/169; 382/237; 382/300; 364/468.01; 364/551.02; 348/441; 358/518; 358/523; 345/20; 345/63; 345/77; 345/147
[58] Field of Search ................................... 382/300, 131, 382/132, 133, 134, 158, 274, 167, 169, 237; 364/468.01, 551.02; 358/518, 523; 345/20, 63, 77, 147; 348/441

[56] References Cited

U.S. PATENT DOCUMENTS

| | | |
|---|---|---|
| 4,980,828 | 12/1990 | Kapcio ............................ 364/413.13 |
| 5,148,809 | 9/1992 | Biegeleisen-Knight et al. .. 128/660.07 |
| 5,369,499 | 11/1994 | Yip .......................................... 358/406 |
| 5,598,185 | 1/1997 | Holmgren ............................... 345/153 |
| 5,600,574 | 2/1997 | Reitan .................................... 364/552 |
| 5,630,101 | 5/1997 | Sieffert .................................. 395/500 |
| 5,696,850 | 12/1997 | Parulski et al. ........................ 382/261 |

*Primary Examiner*—Jose L. Couso
*Assistant Examiner*—Kanji Patel
*Attorney, Agent, or Firm*—Quarles & Brady

[57] ABSTRACT

To transmit images over a network between an imager and one of several reproduction devices, an correction function is determined which adjusts the image to produce optimal reproductions from the selected device. To derive the correction function, a test pattern image with different gray scale regions is sent to and reproduced by each reproduction device. The optical density of each region in the reproduced test pattern images is measured and employed to derive the correction function. Thereafter, when a image is sent over the network, the correction function for the recipient reproduction device is applied to produce a corrected image which is sent over the network.

2 Claims, 2 Drawing Sheets

METHOD FOR COMPENSATING IMAGE DATA TO ADJUST FOR CHARACTERISTICS OF A NETWORK OUTPUT DEVICE

BACKGROUND OF THE INVENTION

The present invention relates medical imaging equipment, and more particularly transmitting image data over a network to any one of a plurality of output devices, such as printers and display workstations.

Large medical centers have several different types of medical imaging equipment including X-ray apparatus, computed tomography scanners and an magnetic resonance imaging system. All of these types of imaging equipment are capable of displaying the image of a patient on a video monitor OR FILM for viewing by medical personnel. Specific equipment within each of these types of imaging apparatus also are capable of short term storage of the digitized image data for later retrieval and display on the video monitors. However, the images ultimately are printed on photographic film for interpretation and retention. As a consequence, each piece of imaging equipment has a dedicated workstation with a high resolution video monitor and is attached to a particular laser printer which produces a hard copy of the medical image on photographic film. A particular imaging system is configured for its dedicated workstation monitor and attached printer to produce images of consistent high quality.

There is a trend in large medical facilities to connect the various types of imaging apparatus to a communication network which enables the images to be produced on film printers and workstations throughout the facility. This integrated network relieves medical personnel of having to go to the dedicated workstation or printer in order to obtain an image from the associated imaging device, instead the image can be sent to an image reproduction device near the medical personnel. In addition the same workstation or printer can be used to produce images that have been acquired by different pieces of medical imaging equipment. The network also may allow the medical personnel to retrieve images acquired in the past and archived in a memory device attached to the network. Thus the personnel can utilize a single workstation to compare a current image of the patient with one taken sometime ago, or to view images from many imaging systems at one conventient location.

With such a network and the increase of digital medical imaging workstations, a video display which produces a soft copy of the medical image is becoming the preferred mode of presenting medical images. This has caused an increased concern among the medical community, because each video monitor has its own luminance response characteristic for the conversion of digital picture elements into light for the display of information across the full dynamic display range. However, a particular monitor on the network no longer is dedicated to only one imaging system and thus is not calibrated for the images produced by that one system. This calls for a quality control procedure to ensure optimal display of medically significant information.

An additional need for quality control arises from the fact that images ultimately are interpreted by the radiologist as hard copy produced on photographic film. This requires that the hard copy images convey the same diagnostic information as the soft copy images and vice versa. Thus the hard copy images produced on a laser printer should be equivalent regardless of which printer was used to generate the film image. However, each laser printer also has its own intensity response characteristic. To complicate matters further, the print quality from any given laser printer is affected by changes in film type, chemistry of the film development process, and cleaning of the apparatus.

Therefore, it is desirable to ensure consistency and high quality among medical images regardless of the source or reproduction device and whether the output is a soft or hard copy. In other words, all of the images produced anywhere on the network should convey the same diagnostic information.

SUMMARY OF THE INVENTION

A general object of the present invention is to provide a method for calibrating an image reproduction process to compensate for the image reproduction characteristics of the particular one of several reproducing devices selected to produce the image.

Another object is to provide a method for determining an image correction function for each reproduction device, and then processing image data being sent over the network using the image correction function so that the image will appear the same regardless of which reproduction device produces the image.

A further object of the present invention is to provide a method for measuring image reproduction characteristics of a given reproducing device in order to determine the image correction function.

These and other objects are fulfilled by a novel method for transmitting an image between a medical image apparatus and one of a plurality of image reproduction devices connected to a communication link. Each of these image reproduction devices has an individual luminance response characteristic and other parameters which result in a different image transfer characteristic by which the incoming image signal is converted into a rendering of the medical image. If the reproduction device has an ideal image transfer function $D(x)$, where x represents the grey scale picture element values, a reproduced image will be a exact replica of the image acquired by the medical image apparatus. However, exact reproduction rarely, if ever, occurs in practice and the image data must be corrected for the non-ideal image transfer characteristic $M(x)$ of the particular image reproduction device to be used.

This first requires derivation of a correction function $C(x)$ given by the expression:

$$D(x)=M\{C(x)\}$$

which can be rearranged to:

$$C(x)=M^{-1}\{D(x)\}$$

where $M^{-1}\{\ \}$ is the inverse of $M\{\ \}$.

In the preferred embodiment, the image correction function are determined empirically by having the image reproduction device produce an image of a test pattern which has a plurality of regions of different known gray scale densities. The optical density of each of these regions is measured and the above relationship applied to the measurement to derive the a set of correction values. A set of correction values is stored for each of the image reproduction devices on the network.

Thereafter, when a given image is to be sent over the network the particular image reproduction device that is to receive the given image is selected and its stored image correction function is accessed. The given image is processed with the appropriate image correction function to produce a corrected image. The corrected image is transmitted over the communication link to the selected image reproduction device.

DETAILED DESCRIPTION OF THE INVENTION

Figure 1:
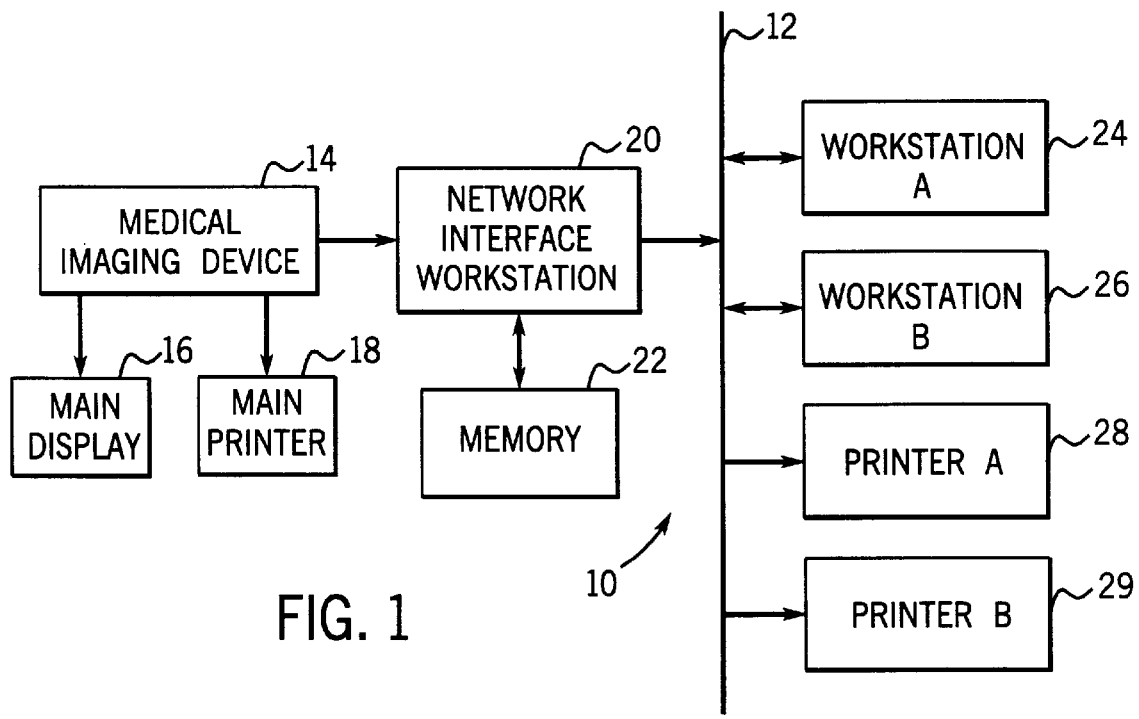
FIG. 1 is a block schematic diagram of a medical imaging communication network incorporating the present invention.

With initial reference to FIG. 1, a communication network, generally designated 10, may be provided within a hospital or other medical facility. The network 10 comprises a communication link 12 which includes a wire or fiber optic cable to distribute data throughout the medical facility. For example, one type of communication network presently being used in medical facilities utilizes the DICOM communication protocol standard and equipment from different manufacturers utilizes that protocol so that data may be communication among several pieces of equipment. Various input and output devices are connected to the communication link 12.

The exemplary network 10 connects to a medical imaging device 14 which may be a computed radiography apparatus, a computed tomography (CAT) scanner or a magnetic resonance imaging (MRI) system. That imaging device 14 incorporates a main display 16, such as a video monitor, that is part of the device's workstation, and a main printer 18 which produces hard copies of the medical images on photographic film. The medical imaging device 14 may have storage capacity for retaining one or more images that it produces of a patient.

The images produced by medical imaging device 14 can be communicated to a network interface workstation 20 which is a personal computer-like device that includes a CPU, input/output circuits, a keyboard for data entry, a video monitor on which to display information to the user, and a memory 22. The network interface workstation 20 is connected to the network communication link 12 and handles the transmission of data from the medical imaging device 14 over the network utilizing the predefined communication protocol for the communication link 12. As will be described, the network interface workstation 20 also manipulates the image data from the medical imaging device adjust for the image transfer characteristic of the particular image reproduction device on the network 10 to which the information is being transmitted. Although only one medical imaging device 14 and associated network interface workstation 20 are shown, the typical medical facility would have several different imaging systems connected to the communication link 12 by separate interface workstations.

Also connected to the communication link 12 and part of the imaging communication network 10 are a plurality of image reproduction devices, such as commercially available workstations 24 and 26 and laser printers 28 and 29. The workstations 24 and 26 have high resolution video monitors at which medical personnel can view images acquired by the medical imaging device 14, and the laser printers 28 and 29 produce hard copies of patient images on film. For example laser printers similar to the main printer 18 may be connected to the communication link 12. As noted previously, each image reproduction device 24–29 has an image transfer characteristic which affects how the digital picture elements of image data from the network are converted into a visual image.

Prior to transmitting images over the communication network 10 to a particular image reproduction device 24–29, the network interface workstation 20 is configured with an image correction table in order to adjust the image data for the image transfer characteristic of the particular workstation. This adjustment produces images of optimum contrast regardless of which image reproduction device is being used. It is assumed that the medical imaging device 14 has been calibrated to provide an optimum high quality image on its dedicated main display device 16 and printer 18. Therefore, the goal is to duplicate that appearance from all the other image reproduction devices 24–28 on the communication network 10. The calibration of the medical imaging device 14 defines an optimal image transfer function $D(x)$ for each different type of reproduction device on the network, where x represents picture element values throughout the full the grey scale range. The optimal image transfer function $D(x)$ represents the that produces the optimum image from that type of device. However, individual image reproduction devices of a given type will vary slightly from that optimal image transfer function $D(x)$ and thus image data sent to a specific reproduction device must be corrected for the variation of that device. Since overall performance of any image reproduction device on the network is determined by its particular transfer characteristic $M(x)$, the goal is to choose a correction function $C(x)$ such that:

$$D(x) = M\{C(x)\}. \qquad (1)$$

Accordingly, $C(x)$ is given by:

$$C(x) = M^{-1}\{D(x)\} \qquad (2)$$

where $M^{-1}\{\ \}$ is the inverse of $M\{\ \}$. The values of $D(x)$ and $M(x)$ are expressed in terms of optical density which is defined by the expression:

$$\text{optical density} = \log_{10}(I_0/I_1) \qquad (3)$$

where for a film image, $I_0$ is the intensity of visible light incident upon a small area of the film and $I_1$ is the intensity of light transmitted by that region of the film. Using equation (3), $I_1$ can be written as:

$$I_1(x) = k(10^{-\text{optical density}}) \qquad (4)$$

where k is a constant. The present method uses these fundamental relationships to create a correction function or a table of image correction values for each image reproduction device on the network according to the following process. Whenever anything occurs which may affect the reproduction of images, such as repairs or cleaning of a reproduction device or the film delveoping equipment or changes in the film development chemistry, a new set of image correction values for the image reproduction devices affected by the change must be derived in order to recalibrate those affected devices to produce optimal images.

Figure 3:
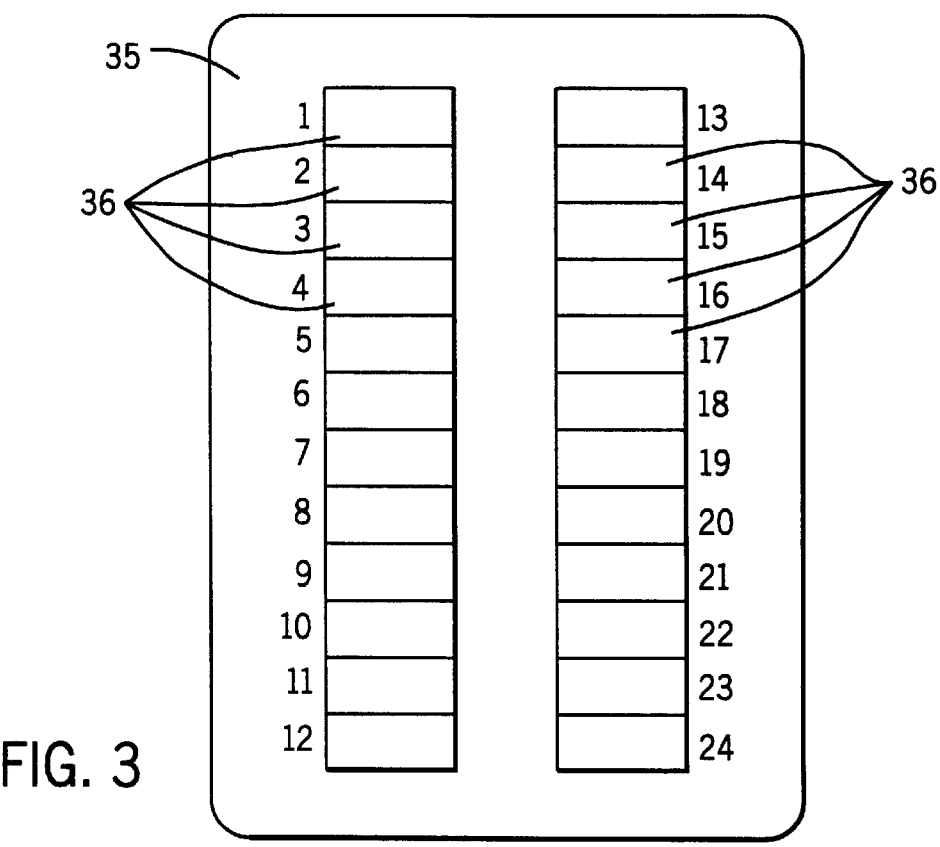
FIG. 3 is a flow chart of steps in the present method.
Figure 2:
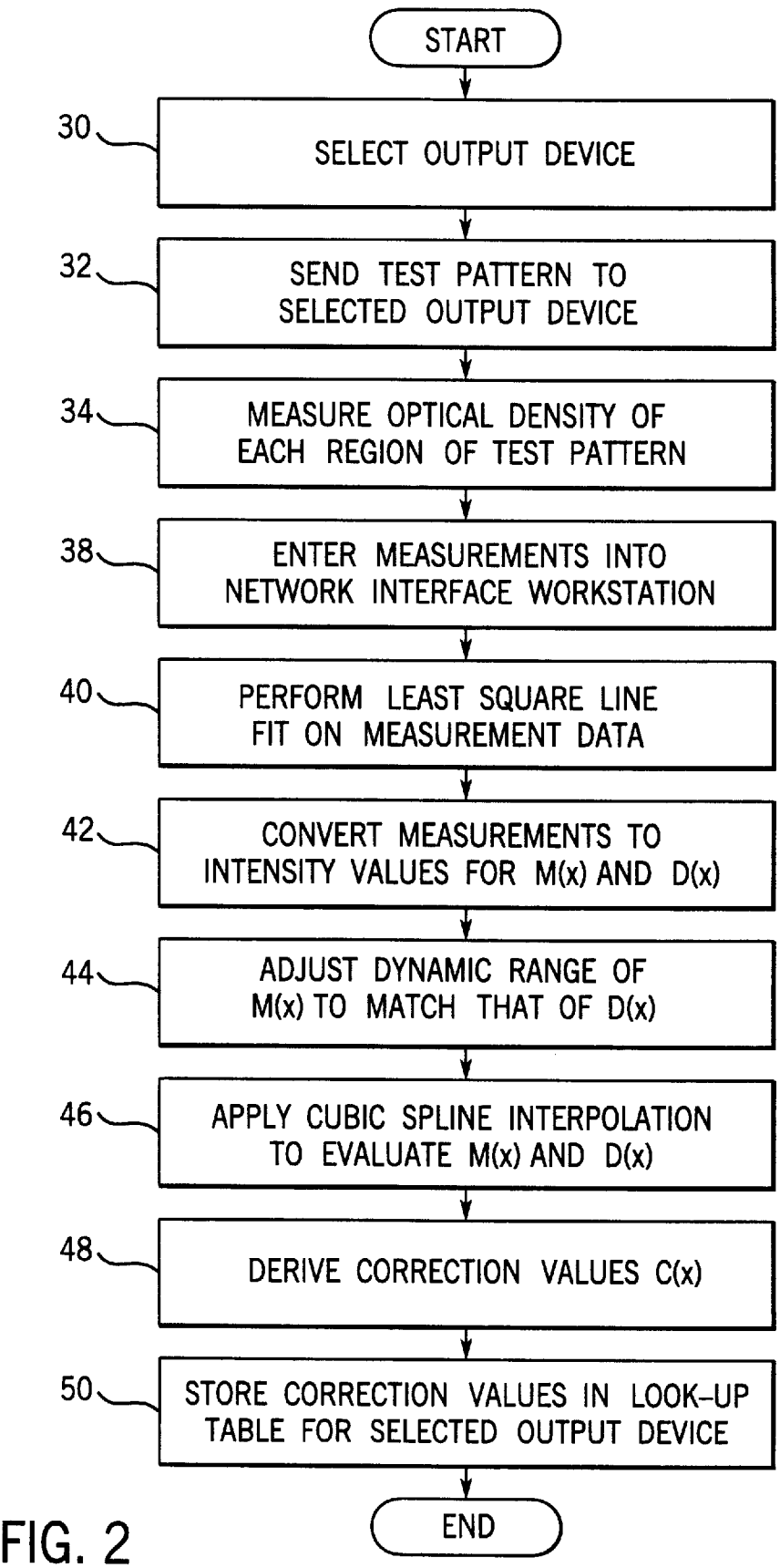
FIG. 2 depicts an example of a test pattern utilized in the present method.

With reference to FIG. 2, the process for deriving the correction data commences at step 30 with the technician accessing the communication program in the network interface workstation 20 and bringing up the standard network menu which identifies all of the devices on the network to which image data can be transmitted. The technician selects the particular image reproduction device for which the correction data is to be created and enters that selection into network interface workstation 20. The method then advances to step 32 where the technician enters a command into the network interface workstation which causes that device to transmit a standard test pattern, such as the one depicted in FIG. 3, over the communication link 12 to the selected image output device, which may either be one of the workstations 24 or 26 or a printer 28 or 29. Upon receiving the test pattern, the selected image reproduction device produces an image utilizing the test pattern data. In the case of a workstation 24 or 26 that image would be displayed on its video monitor screen, whereas the printers 28 or 29 would produce the test pattern image on photographic film. The exemplary test pattern 35 has twenty-four regions 36 of different grey scale density in increments ranging from white to black in the ideally reproduced image.

Next, at step 34, the technician goes to the image reproduction device and views the created test pattern image. Using a conventional optical densitometer or light meter, the technician measures the optical density or light measurements of each region 36 in the test pattern image reproduced on the monitor screen of a workstation 24 or 26, or on a piece of film by a printer 28 or 29. Optical density measurements are entered into the network interface workstation 20 via its keyboard at step 38. This portion of the process produces a table of twenty-four optical density measurements which represent the image reproduction device's replication of the test pattern image.

Ideally, a plot of the measured optical density values versus the digital values for the picture elements that produced the regions of the test pattern image should form a straight line as the perfect image transfer function for computed radiography is linear. However, the actual measurements for that modality probably will deviate from a straight line. As a consequence, at step 40 a standard least square line fit is performed on the measured values to produce a linear contrast curve corresponding to the measured data. Next at step 42, equation (4) given above is used to convert optical density values on the linear contrast curve into picture element intensity values for transfer characteristic $M(x)$. A similar procedure also is used at this step to convert the optical density values of the standard function $D(x)$ for medical imaging device 14 into picture element intensity values.

Thereafter, the dynamic range of the measured intensity values are adjusted to match the dynamic range of intensity values for the standard function $D(x)$, at step 44. A cubic spline interpolation is applied at step 46 to both measured intensity data $M(x)$ and the standard function intensity values $D(x)$ to produce values for each of the x values in the full gray scale dynamic range. Then at step 48, equation (2) given above is utilized to find values of the correction function $C(x)$ for each possible digital picture element value. The array of correction values for each digital picture element value is stored in a look-up table within the memory 22 of the network interface workstation 20 at step 50. Alternatively, the correction data could be used to derive a correction function that is to be applied to image data thereby eliminating a need for a look-up table. Then, the procedure for defining the correction function data terminates.

A similar procedure is utilized to define a look-up table of correction function values for other reproduction devices 24–29 on the communication link 12 to which images from medical imaging device 14 may be sent. Thus, memory 22 of the network interface workstation 20 contains a similar correction look-up table for each network image reproduction device.

In order to send an image over the communications link 12 from the medical imaging device 14 to an image reproduction device 24–29, the technician selects the particular image reproduction device via the network interface workstation 20. The image then is transferred from the medical imaging device 14 to the network interface workstation 20. As each digital picture element in the image is received from medical imaging device 14, network interface workstation 20 utilizes the digital intensity value of that picture element to obtain the corresponding corrected picture element intensity value from the look-up table within memory 22 associated with the selected image reproduction device 24–29. The corrected picture element value is transmitted as the image data over the communication link 12 to that selected image reproduction device. In doing so the network interface workstation 20 formats the picture elements into data packets according to the image transmission protocol for the communication link 12.

Thus, the image reproduction device receives a corrected image which permits it to produce a consistent output image regardless of which image reproduction device 16 or 24–29 is utilized. That is, the quality of the images produced by the image reproduction devices on the communication link 12 will be the same high quality resolution as the main display device 16 that is dedicated to the originating medical imaging device 14.

The foregoing description is directed primarily to the preferred embodiments of the invention. Although some attention was given to various alternatives within the scope of the invention, it is anticipated that skilled artisans will likely realize additional alternatives that are now apparent from the disclosure of those embodiments. Accordingly, the scope of the invention should be determined from the following claims and not limited by the above disclosure.

I claim:

1. A method for transmitting an image between a medical imaging device and one of a plurality of image reproduction devices connected to a communication link, the method comprising steps of:

defining an image correction function for converting image data produced by the medical imaging device into corrected image data which has been adjusted to compensate for particular characteristics of one of the plurality of image reproduction devices, wherein defining the image correction function includes:

(a) producing an image of a test pattern on the one image reproduction device, wherein the test pattern has a plurality of regions of different gray scale densities, (b) measuring a value of gray scale density for each of the plurality of regions in the image of the test pattern to produce values of an image transfer characteristic $M(x)$ of the one image reproduction device, (c) fitting a linear function to the measured values of gray scale density of the image transfer characteristic $M(x)$.

(d) converting values of the linear function of the image transfer characteristic $M(x)$ to intensity values, and (e) deriving values of the correction function according to a relationship:

$$D(x)=M\{C(x)\}$$

where $D(x)$ is an optimal image transfer function in which the image produced by the one image reproduction device is a preferred rendition of the test pattern, with x representing the grey scale picture element values, and $C(x)$ is the image correction function;

storing the image correction function;

repeating the preceding steps for each of the plurality of image reproduction devices;

selecting a particular one of the plurality of image reproduction devices to receive a given image;

processing the given image with the image correction function associated with the particular one of the plurality of image reproduction devices to produce a corrected image; and transmitting the corrected image over the communication link to the particular one of the plurality of image reproduction devices.

2. A method for transmitting an image between a medical imaging device and an image reproduction device connected to a communication link, wherein the image is formed by a plurality of picture elements each having value from within a range of X gray scale levels where X is an integer, the method comprising steps of;

producing an image of a test pattern on the image reproduction device, wherein the test pattern has a Y regions of different gray scale densities, where Y is less than X, measuring a value of gray scale density for each of the Y regions in the image of a test pattern to produce Y measured values of gray scale density which collectively form values of an image transfer characteristic $M(x)$ of the image reproduction device, determining a best linear function fit for image transfer characteristic $M(x)$, converting the Y optical density values of the linear function for image transfer characteristic $M(x)$ into Y intensity values, interpolating values for the X gray scale levels from the Y intensity values of the image transfer characteristic $M(x)$;

deriving the corrected gray scale values each of the X gray scale levels using relationship, and $$D(x)=M\{C(x)\}$$

where $D(x)$ is an optimal image transfer function in which the image produced by the one image reproduction device is an accurate rendition of the test pattern and $C(x)$ is the image correction function;

storing corrected gray scale values in a look-up table; and thereafter when transmitting an image between the medical imaging device and the image reproduction device:
a) obtaining a corrected gray scale value from the look-up table associated with the value of each picture element in the image, and
b) transmitting corrected gray scale values over the communication link to the image reproduction device.

* * * * *